United States Patent
Sherman et al.

(10) Patent No.: US 9,053,152 B2
(45) Date of Patent: Jun. 9, 2015

(54) SEARCH AND CONTEXT BASED CREATION IN DYNAMIC WORKSPACES

(75) Inventors: Yahali Sherman, Tel Aviv (IL); Vitaly Vainer, Kfar Saba (IL)

(73) Assignee: SAP Portals Israel Ltd, Ra'anana (IL)

(*) Notice: Subject to any disclaimer, the term of this patent is extended or adjusted under 35 U.S.C. 154(b) by 303 days.

(21) Appl. No.: 13/567,639

(22) Filed: Aug. 6, 2012

(65) Prior Publication Data
US 2014/0040263 A1  Feb. 6, 2014

(51) Int. Cl.
*G06F 17/30* (2006.01)

(52) U.S. Cl.
CPC .... *G06F 17/30507* (2013.01); *G06F 17/30528* (2013.01)

(58) Field of Classification Search
CPC .............................................. G06F 17/30
USPC ................................. 707/600–899
See application file for complete search history.

(56) References Cited

U.S. PATENT DOCUMENTS

| | | | |
|---|---|---|---|
| 6,023,765 A | 2/2000 | Kuhn | |
| 6,453,353 B1 | 9/2002 | Win et al. | |
| 6,871,232 B2 | 3/2005 | Curie et al. | |
| 6,910,041 B2 | 6/2005 | Exton et al. | |
| 8,321,430 B2 | 11/2012 | Zvi et al. | |
| 8,583,678 B2 | 11/2013 | Vainer et al. | |
| 8,685,935 B2 | 4/2014 | Brand et al. | |
| 8,751,558 B2 | 6/2014 | Bleier et al. | |
| 2005/0021369 A1 | 1/2005 | Cohen et al. | |
| 2011/0088046 A1 | 4/2011 | Guertler et al. | |
| 2011/0137909 A1 | 6/2011 | Guertler et al. | |
| 2012/0041922 A1 | 2/2012 | Vainer et al. | |
| 2013/0086483 A1 | 4/2013 | Vainer et al. | |
| 2013/0086495 A1 | 4/2013 | Guzansky et al. | |
| 2013/0091132 A1 | 4/2013 | Khalatov et al. | |
| 2013/0091456 A1 | 4/2013 | Sherman et al. | |
| 2013/0139081 A1 | 5/2013 | Alon et al. | |
| 2013/0144957 A1 | 6/2013 | Sherman et al. | |
| 2013/0159926 A1 | 6/2013 | Vainer et al. | |
| 2013/0166547 A1* | 6/2013 | Pasumarthi et al. ......... 707/728 |
| 2014/0013000 A1 | 1/2014 | Vainer et al. | |
| 2014/0019533 A1 | 1/2014 | Sherman et al. | |
| 2014/0019958 A1 | 1/2014 | Sherman | |
| 2014/0040177 A1 | 2/2014 | Sherman et al. | |
| 2014/0040178 A1 | 2/2014 | Sherman et al. | |
| 2014/0040263 A1 | 2/2014 | Sherman et al. | |

* cited by examiner

*Primary Examiner* — Isaac M Woo
(74) *Attorney, Agent, or Firm* — Fish & Richardson P.C.

(57) ABSTRACT

The disclosure generally describes computer-implemented methods, software, and systems for search-, context-, and rule-based creation and runtime adaptation in dynamic workspaces. One computer-implemented method includes identifying a data artifact associated with each search result of at least one received search result, associating each identified data artifact with a module category of a plurality of module categories, injecting the identified artifacts into a content gallery, categorize, by operation of at least one computer, the injected identified artifacts within the content gallery, presenting at least a subset of the injected identified artifacts on an enterprise workspace page associated with an enterprise workspace, and constructing a context associated with at least one of the enterprise workspace or the enterprise workspace page.

21 Claims, 4 Drawing Sheets

SEARCH AND CONTEXT BASED CREATION IN DYNAMIC WORKSPACES

BACKGROUND

An enterprise workspace provides a flexible, intuitive environment for single users and/or teams or groups of users to create, integrate, organize, compose, modify, and delete, through the use of content modules, both structured and unstructured content on customizable personal or shared pages within the enterprise workspace. Pages may be assigned a permission/role policy that determines what content each user may see and interact with on a page depending upon a permission/role assigned to the user. The use of enterprise workspace pages may be resisted by organizations due to their static nature and administrative time necessary to perform updates to pages in light of multiple possible permissions/roles that may apply to users. This lack of agility affects the organizations' ability to quickly make changes to an enterprise workspace system and an overall agility to adapt to changing business or other conditions. As a result the organizations may seek alternative solutions to enterprise workspaces.

SUMMARY

The present disclosure relates to computer-implemented methods, software, and systems for search-, context-, and rule-based creation and runtime adaptation in dynamic workspaces. One computer-implemented method includes identifying a data artifact associated with each search result of at least one received search result, associating each identified data artifact with a module category of a plurality of module categories, injecting the identified artifacts into a content gallery, categorize, by operation of at least one computer, the injected identified artifacts within the content gallery, presenting at least a subset of the injected identified artifacts on an enterprise workspace page associated with an enterprise workspace, and constructing a context associated with at least one of the enterprise workspace or the enterprise workspace page.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprises, prior to identifying the data artifact associated with each search result, receiving at least one search result from a search system, wherein the search system has access to internal and external data sources.

A second aspect, combinable with any of the previous aspects, further comprises identifying a ranking associated with each identified data artifact.

In a third aspect, combinable with any of the previous aspects, the subset of injected identified artifacts presented on the enterprise workspace page is selected based upon the identified ranking.

In a fourth aspect, combinable with any of the previous aspects, injected identified artifacts are categorized within the content gallery according to a type and a source.

In a fifth aspect, combinable with any of the previous aspects, the subset of the injected identified artifacts arranged on the enterprise workspace page according to a predefined enterprise workspace page layout.

A sixth aspect, combinable with any of the previous aspects, further comprising adding non-presented injected artifacts from the content gallery to the enterprise workspace page.

The subject matter described in this specification can be implemented in particular implementations so as to realize one or more of the following advantages. First, there is no need for static persistence of an enterprise workspace and/or enterprise workspace pages. Second, content on the enterprise workspace and/or the enterprise workspace pages can be dynamically created and/or changed. In some implementations, the creation and/or changing of the content may based on contextual search results and or defined rules. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The disclosure generally describes computer-implemented methods, software, and systems for search-, context-, and rule-based creation and runtime adaptation in dynamic workspaces.

For the purposes of this disclosure, an enterprise resource portal (ERP), also known as an enterprise information portal (EIP) or a corporate portal, is a framework for integrating information, people, and processes across organizational boundaries. An ERP provides a secure unified access point, often in the form of a web-based user interface, and is designed to aggregate and personalize information through application-specific portals. The ERP is a de-centralized content contribution and content management system, which keeps the information always updated. With only a web browser, enterprise portal users can begin work once they have been authenticated in the ERP which offers a single point of access to information, enterprise applications, and services both inside and outside an organization. ERPs may present information from diverse sources in a unified and structured way, and provide additional services, such as dashboards, an internal search engine, e-mail, news, navigation tools, and various other features. ERPs are often used by enterprises for providing their employees, customers, and possibly additional users with a consistent look and feel, and access control and procedures for multiple applications, which otherwise would have been separate entities altogether.

Enterprise Workspace (EWS) technology leverages existing ERP capabilities and acts as an "add-on" to ERP technology. For example, EWS user interface (UI) technology may run on top of existing ERP technology. EWS functionality provides a flexible, intuitive environment for single EWS users and/or teams or groups of EWS users to create, integrate, organize, compose, modify, and delete, through the use of modules, both structured and unstructured content on EWS pages within an EWS. EWS technology allows EWS users to take advantage of a "self-service," that is a decentralized, approach in assembling content on EMS pages, often without involvement by an enterprise's information technology group.

Figure 1:
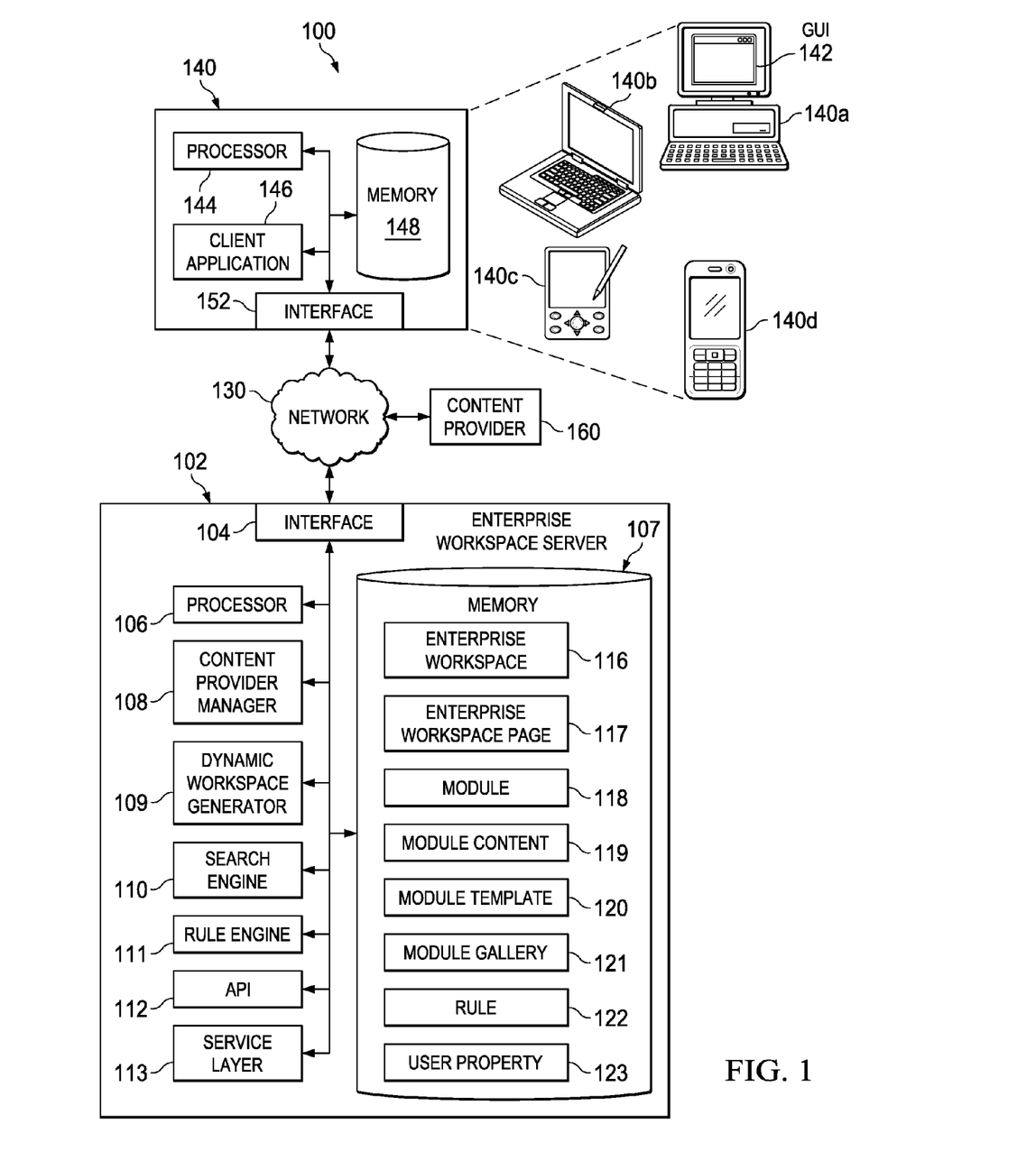
FIG. 1 is a block diagram illustrating an example system for creating dynamic workspaces.

FIG. 1 illustrates an example distributed computing system 100. Specifically, the illustrated example distributed computing system 100 includes or is communicably coupled with an EWS server 102, a client 140, and content provider 160 that communicate across a network 130.

At a high level, the EWS server 102 is an electronic computing device operable to receive, transmit, process, store, or manage data and information associated with the example distributed computing system 100. The EWS server 102 allows EWS users to compose, modify, delete, and deploy EWS pages. Through a graphical user interface (GUI), an EWS server 102 user, for example using a client 140, is provided with an efficient and user-friendly presentation of data provided by or communicated within the example distributed computing system 100.

In general, the EWS server 102 is a server that stores a content provider manager 108, a dynamic workspace generator 109, a search engine 110, and a rule engine 111 where at least a portion of the content provider manager 108, the dynamic workspace generator 109, the search engine 110, and/or the rule engine 111 is executed using requests/responses sent from/to a client 140 within and communicably coupled to the illustrated example distributed computing system 100 using network 130. In some implementations, the EWS server 102 may store a plurality of various content provider managers 108, dynamic workspace generators 109, search engines 110, and/or rule engines 111. In other implementations, the EWS server 102 may be a dedicated server meant to store and execute only a single content provider manager 108, dynamic workspace generator 109, search engine 110, and/or rule engine 111. In some implementations, the EWS server 102 may comprise a web server, where content provider manager 108, the dynamic workspace generator 109, the search engine 110, and/or the rule engine 111 represents one or more web-based applications accessed and executed by the client 140 using the network 130 or directly at the EWS server 102 to perform the programmed tasks or operations of the content provider manager 108, the dynamic workspace generator 109, the search engine 110, and/or the rule engine 111.

In some implementations, any or all of the content provider manager 108, the dynamic workspace generator 109, the search engine 110, and/or the rule engine 111, and/or other components of the EWS server, both hardware and/or software, may interface with each other and/or the interface using an application programming interface (API) 112 and/or a service layer 113. The API 112 may include specifications for routines, data structures, and object classes. The API 112 may be either computer language independent or dependent and refer to a complete interface, a single function, or even a set of APIs. The service layer 113 provides software services to the example distributed computing system 100. The functionality of the enterprise server 102 may be accessible for all service consumers via this service layer. Software services, such as provide reusable, defined business functionalities through a defined interface. For example, the interface may be software written in extensible markup language (XML) or other suitable language. While illustrated as an integrated component of the EWS server 102 in the example distributed computing system 100, alternative implementations may illustrate the service layer 113 as a stand-alone component in relation to other components of the example distributed computing system 100. Moreover, any or all parts of the service layer 113 may be implemented as child or sub-modules of another software module, enterprise application, or hardware module without departing from the scope of this disclosure.

Specifically, the EWS server 102 is responsible for receiving application requests, for example to view, create, or define rules to create, for example, dynamic workspaces/pages and/or search for content to include in the dynamic workspaces/pages, from one or more client applications associated with the client 140 of the example distributed computing system 100. The EWS server is also responsible for responding to the received requests by processing said requests in the associated content provider manager 108, dynamic workspace generator 110, search engine 110, and/or rule engine 111, obtaining content from the EWS server 102 and/or content provider 160 and sending an appropriate response back to the requesting client application. In addition to requests from the client 140, requests may also be sent from internal, external. or third-party users, other automated applications, as well as any other appropriate entities, individuals, systems, or computers. According to one implementation, EWS server 102 may also include or be communicably coupled with an e-mail server, a web server, a caching server, a streaming data server, and/or other suitable server. In other implementations, the EWS server 102 and related functionality may be provided in a cloud-computing environment.

As illustrated in FIG. 1, the EWS server 102 includes an interface 104. Although illustrated as a single interface 104 in FIG. 1, two or more interfaces 104 may be used according to particular needs, desires, or particular implementations of the example distributed computing system 100. The interface 104 is used by the EWS server 102 for communicating with other systems in a distributed environment—including within the example distributed computing system 100—connected to the network 130; for example, the client 140, as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

As illustrated in FIG. 1, the EWS server 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the EWS server 102. Specifically, the processor 106 executes the functionality required to receive and respond to requests from the client 140 and/or create, integrate, organize, compose, modify, and delete EWS workspaces, pages, content, and/or other suitable data structures and/or content associated with enterprise workspaces.

The EWS server 102 also includes a memory 107 that holds data for the EWS server 102. Although illustrated as a single memory 107 in FIG. 1, two or more memories may be used according to particular needs, desires, or particular implementations of the example distributed computing system 100. While memory 107 is illustrated as an integral component of the EWS server 102, in alternative implementations, memory 107 can be external to the EWS server 102 and/or the example distributed computing system 100.

In some implementations, the memory 107 includes an EWS 116, an EWS page 117, a module 118, module content 119, a module template 120, a module gallery 121, a rule 122, and a user property 123. Although illustrated as single components in FIG. 1, two or more EWSs 116, EWS pages 117, modules 118, module content 119, module templates 120, module gallery 121, rules 122, and user properties 123 may be used according to particular needs, desires, or particular implementations of the example distributed computing system 100.

The EWS 116 is a central repository of knowledge. EWS 116 generation may be performed either at design-time or runtime and may be based upon, for example, EWS 116 properties, an EWS 116 owner profile, EWS 116 viewer properties, and/or other suitable values. For example, the EWS 116 owner profile may include age, address, medical profile, etc. The EWS 116 viewer profile may include role, relation to the EWS 116 owner, location, etc. In some implementations, the EWS 116 is associated with a context. For example, the EWS 116 may be associated with a specific user, for example a particular heart patient, and a support group associated with the heart patient, for example, the patient's doctor, friends and family, etc. The EWS 116 may be either personal or shared. The personal EWS 116 is a private area where a single user can maintain personal content on a particular EWS page 117 (described below) not accessible by other EWS users. A shared EWS 116 is an area where multiple EMS users, for example the support group or friends and family of the heart patient, can access shared EWS pages 117. A shared EWS 116 is assigned a role/permission policy and each EWS user may be provided a role and associated permission in the shared EWS 116. Roles may be, for example, workspace owner, workspace manager, and/or workspace member. Associated permissions may be, for example, the ability to create, rename, and/or delete EWS pages 117 and view/update particular content associated with EWS pages 117 and/or specific modules 118 (described below) associated with the EWS pages 117. In some implementations, EWS users may have multiple permission levels/roles. In some implementations, users can also customize the EWS 116 with different layouts, branding, and themes. In some implementations, an EWS 116 instance is created from a reusable EWS template (not illustrated). An EWS template has the same or similar structure as an EWS 116 and is an EWS associated with a template tag but not an actual EWS 116 instance. If a new instance of an EWS 116 is created based on an EWS template, the EWS template is copied and used as the base for the EWS 116 instance.

The EWS page 117 is a container item defining a layout to structure the position of one or modules 118. In some implementations, EWS users may create, rename, and/or delete EWS pages 117 as well as customize EWS pages 117 with different layouts, branding, and themes. EWS users may define one or more EWS pages 117 for each EWS 116. The EWS 116 may contain, for example, static EWS pages 117, EWS page 117 templates, and/or dynamically generated EWS pages 117. Static pages are defined at design time and contain content that does not change while dynamic EWS pages 117 are dynamically created, modified, and/or deleted at runtime and contain changeable, that is "dynamic" content. In some implementations, an EWS page 117 instance is created from a reusable EWS page template (not illustrated) similar to the above-mentioned EWS template. An EWS page template has the same or similar structure as an EWS page 117 and in an EWS page associated with a template tag but not an actual EWS page 117 instance. If a new instance of an EWS page 117 is created based on an EWS page template, the EWS page template is copied and used as the base for the EWS page 117 instance.

A module 118 is a content item that runs in a personal or shared EWS page. Module content 119 may include, for example, applications, reports, dashboards, web content (e.g., audio, video, images, RSS feeds, etc.), and documents either from an enterprise or non-enterprise system(s). A module 118 may have abilities to respond to workspace events and may have associated back-end data and a property set. A module 118 may also parameterized by the EWS user to allow changes to the back-end data and property set of the module 118 at runtime. In some implementations, a module 118 instance is created from a reusable module template 120. In these implementations, an EWS user may use a GUI to drag-and-drop a module template 120 from a module gallery 121, a library of available modules templates 120, to an EWS page 117 to create a particular module 118 instance. In other implementations, methods and actions other than drag-and-drop may be used to add the module template 120 to the EWS page 117. An EWS user may edit individual properties of the created module 118 instance's property set for the purposes of the EWS page 117. Editing may include defining a module content 119 source, location properties, user permissions/roles that may view the module 118 and/or specific module content 119, etc. The EWS user may also add, edit, and/or delete back-end data for the module 118. Backend data may include, for example, a description of the module, creator identification, date of creation, or other suitable data. In some implementations, EWS users may customize EWS pages 117 with different layouts, branding, and themes. In some implementations, the EWS user customizations of the EWS 116 and/or the EWS page 117 may automatically affect and/or supersede EWS user-defined/edited properties for a particular module 118 instance. In some implementations, generic/pre-defined modules are available that require little to no modification by an EWS user before use. In some implementations, the EWS 116, EWS 117, and module 118 may be implemented in HTML5 or other suitable computer language.

The rule 122 may represent criteria, conditions, parameters, variables, algorithms, instructions, constraints, references, queries, and any other appropriate information to define and enable the batch creation of EWSs 116 and/or EWS pages 117. A rule-set can define few pages and the rules for each page's content. In some implementations, the rules 122 can add complete EWS templates, EWS 117 pages, and/or EWS page templates to an EWS. In some implementations, rules can define what content, that is modules and specific content associated with the modules, is to be added to the EWS pages 117 based on a specific context and/or the workspace owner/manager/member's user properties 123 (described below). For example, the context of a particular EWS page 117 owned by a patient is "medical heart condition" so modules 118 associated with this heart condition should be used to construct the particular EWS 117 page. Also, the particular EWS page 117 is for EWS users with a role of workspace member (here friends and family). In this example, only content that should be viewable by the workspace members associated with the patient should be displayed on modules 118. In this example, modules 118 that are capable of receiving, for example, parameterized input or modules 118 that are "workspace aware" are used to construct the EWS page 117. In some implementations, the rule 118 can be processed by the rule engine 111 (described below). In other implementations the rule 118 can be processed by any other suitable component of the example distributed computing system 100, for example the content provider manager 108. In some implementations, the rule can be time based. For example, an EWS 116 could be dynamically established only during a specific week during a calendar year in which a conference takes place. In some implementations, the rule 122 can be stored remotely from and accessed by the EWS server 102 using any suitable storage and/or data access method consistent with this disclosure.

The user property 123 is data associated with an EWS user. User property 123 data may include, for example, name, department, position, salary, hire date, a role, system password, contact information, location, locale, and other suitable data. In some implementations, location is a dynamic property that could be extracted from a location-enabled device, for example a mobile telephone, computer, etc., and could change while the location-enabled device is traveling. In some implementations, locale can be used to define a default language of a consuming device. In some implementations, the system password of the consuming device cannot be used and/or saved for security reasons. In some implementations, the user property 123 can be used by the dynamic workspace generator 109 (described below) to determine content to filter/display within modules 118 on an EWS page 117 within an EWS 116. In these implementations, the user property 123 can also be used to determine the ability of the EWS user to view, create, rename, and/or delete EWS pages 117 and update particular viewable content associated with the EWS pages 117 and/or the modules 118.

The content provider manager 108 is any type of application that allows the client 140 to request and view content on the client 140 after obtaining content from the EWS server 102 and/or content provider 160 in response to a received request from the client 140. Content provider 160 may be, for example, applications and data on the EWS server 102 and/or external services, business applications, business application servers, databases, RSS feeds, document servers, web servers, streaming servers, caching servers, or other suitable content sources. In some implementations, the content provider manager 108 enabling the consumption content provider content by client 140. In some implementations, the content provider manager 108 allows connections to various content providers 160, queries the content provider 160 with regards to provided content, and enables an EWS user to add the content to an EWS workspace, EWS workspace page, etc. either manually, through a rule, or using a search query.

In some implementations, the content provider manager 108 can use content provider manager data (not illustrated) or other above-describe data stored in memory 107 to perform tasks associated with the EWS server 102 or other components of the example distributed computing system 100. Content provider manager data may include any type of data associated with and/or used by the content provider manager 108, including content provider locations, addresses, storage specifications, content lists, access requirements, or other suitable data. For example, for a database content provider 160, the content provider manager data may include the server Internet Protocol (IP) address, Uniform Resource Locator (URL), access permission requirements, data download speed specifications, etc. Once a particular content provider manager 108 is launched, a client 140 may interactively process a task, event, or other information associated with EWS server 102. The content provider manager 108 can also be any application, program, module, process, or other software that may execute, change, delete, generate, or otherwise manage information associated with a particular client 140, and in some cases, a business process (not illustrated) performing and executing business process-related events on the EWS server 102 and/or the client 140. In particular, business processes communicate with other clients 140, applications, systems, and components to send and receive events. Additionally, a particular content provider manager 108 may operate in response to and in connection with at least one request received from other content provider managers 108, including a content provider manager 108 associated with another EWS server 102. In some implementations, the content provider manager 108 can be and/or include a web browser. In some implementations, each content provider manager 108 can represent a network-based application accessed and executed using the network 130 (e.g., through the Internet, or using at least one cloud-based service associated with the content provider manager 108). For example, a portion of a particular content provider manager 108 may be a Web service associated with the content provider manager 108 that is remotely called, while another portion of the content provider manager 108 may be an interface object or agent bundled for processing at a remote client 140. Moreover, any or all of a particular content provider manager 108 may be a child or sub-module of another software module or enterprise application (not illustrated) without departing from the scope of this disclosure. Still further, portions of the particular content provider manager 108 may be executed or accessed by a user working directly at the EWS server 102, as well as remotely at a corresponding client 140. In some implementations, the EWS server 102 can execute the content provider manager 108.

The dynamic workspace generator 109 is a software and/or hardware engine providing functionality to dynamically create, modify, and/or delete EWSs 116, EWS pages 117, and/or modules 118. Runtime EWS 116 generation is performed by the dynamic workspace generator 109. At runtime, an EWS 116 structure, that is EWS pages 117/content layout, and/or modules 118, may not be fully defined. EWS 116 generation with an EWS 116 containing dynamic content results in, for example, static EWS pages 117 (if applicable), and EWS page templates (not illustrated), and/or dynamically generated EWS pages 117. In some implementations, the dynamic workspace generator 109 can work in conjunction with the rule engine 111 to perform its functionality, for example in implementing examples presented below with respect to the rule engine 111. In some implementations, the dynamic workspace generator 109 can also take into account user properties 123 to determine whether an EWS 116, EWS page 117, and/or module 118 is created, modified, and/or deleted. In some implementations, the dynamic workspace generator 109 can also determine whether an EWS 116, EWS page 117, and/or module 118 is not visible, that is filtered, for a particular user based upon the user's user properties 123 or other suitable value.

In some implementations, the dynamic workspace generator 109 is web-based and runs in a client 140 browser window. In some implementations, the dynamic workspace generator 109 may be partially or completely provided in a cloud-computing environment. In some implementations, a particular dynamic workspace generator 109 can operate in response to and in connection with at least one request received from a content provider manager 108, search engine 110, and/or rule engine 111. Additionally, a dynamic workspace generator 109 may operate in response to and in connection with at least one request received from another dynamic workspace generator 109, content provider manager 108, and/or search engine 110, including those associated with another EWS server 102. In some implementations, each dynamic workspace generator 109 can represent a web-based application accessed and executed using the network 130 (e.g., through the Internet, or using at least one cloud-based service associated with the dynamic workspace generator 109). For example, a portion of a particular dynamic workspace generator 109 may be a web service associated with a dynamic workspace generator 109 that is remotely called, while another portion of the particular dynamic workspace generator 109 may be an interface object or agent bundled for processing at a remote client 140. Moreover, any or all of a particular dynamic workspace generator 109 may be a child or sub-module of another software module or enterprise application (not illustrated) without departing from the scope of this disclosure. Still further, portions of the particular dynamic workspace generator 109 may be executed or accessed by an EWS user working directly at the EWS server 102, as well as remotely at a corresponding client 140.

The search engine 110 is any software and/or hardware computing device operable to receive, transmit, process, and store any appropriate data associated with the example distributed computing system 100 of FIG. 1 and to perform searching for data related to a search request received from, or any component of, the EWS server 102 and/or the client 140. The search engine 110 may search data on the EWS server 102, client 140, other enterprise workspace servers 102, other clients 140, and/or other data sources external to environment 100 (not illustrated). In some implementations, each search engine 110 can represent a web-based application accessed and executed using the network 130 (e.g., through the Internet, or using at least one cloud-based service associated with the search engine 110). For example, a portion of a particular search engine 110 may be a web service associated with a search engine 110 that is remotely called, while another portion of the particular search engine 110 may be an interface object or agent bundled for processing at a remote client 140. Moreover, any or all of a particular search engine 110 may be a child or sub-module of another software module or enterprise application (not illustrated) without departing from the scope of this disclosure. Still further, portions of the particular search engine 110 may be executed or accessed by an EWS user working directly at the EWS server 102, as well as remotely at a corresponding client 140. Although illustrated as internal to the EWS server 102, in some implementations, the search engine 110 can be external to and communicate with at least the EWS server 102 and/or the client 140 using the network 130.

Figure 2:
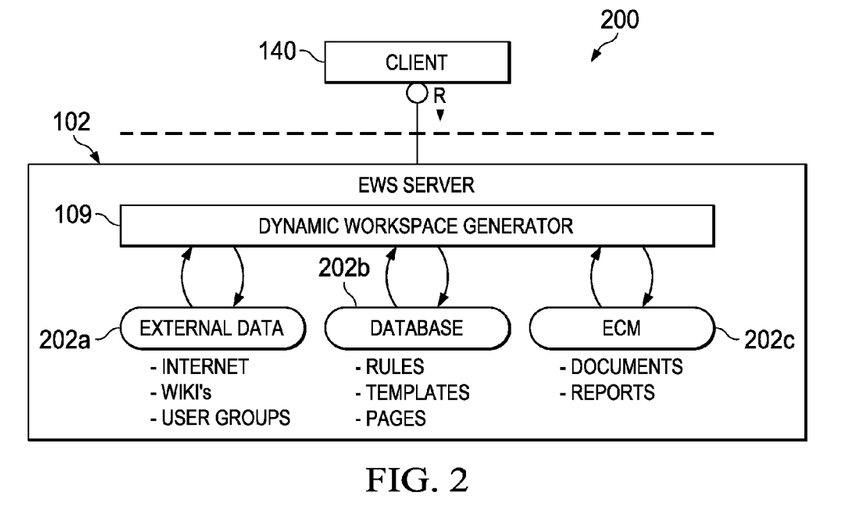
FIG. 2 is a block diagram illustrating dynamic workspace generator data connections.

Turning now to FIG. 2, FIG. 2 is a block diagram 200 illustrating dynamic workspace generator 109 data connections. For example, following a performed search using search engine 110, the dynamic workspace generator 109, using the search results, would have access to data associated with the search results, for example external data 202a, database data 202b, and/or enterprise content management (ECM) data 202c. The illustrated circular relationships between the external data 202a, database data 202b, and ECM data 202c indicates that the dynamic workspace generator 109 may create, modify, and/or delete data associate with each appropriate component and vice versa. The dynamic workspace generator 109 may use the accessible data to configure, for example, content for modules 118, EWS pages 117, and/or an EWS 116. In some implementations, the dynamic workspace generator 109 can have access to a data dictionary (not illustrated); a central, non-redundant, logical description/definition of all data objects used within the example distributed computing system 100. Example data objects include database tables, views, types, domains, search helps, and lock objects. In some implementations, the dynamic workspace generator 109 can have connections to any suitable data source. In some implementations, the search engine 110 can have fewer, the same, and/or more data connections than the dynamic workspace generator 109. In some implementations, the dynamic workspace generator 109 can have fewer, the same, and/or more data connections than the search engine 110.

Returning to FIG. 1, the rule engine 111 can be any application, program, module, process, or other software that may provide methods to evaluate and/or execute at least one rule 122 to define and enable the batch creation of EWSs 116, EWS pages 117, modules 118, and/or other suitable data structures, content, etc. associated with enterprise workspaces. In some implementations, the owner of the EWS 116, EWS pages 117, and or module 118 or other suitably designated user can define the rules 122.

The rule engine 111 also connects existing items, for example modules 118 and EWS pages 117. In this example, the rule engine 111 may connect the modules 118 with EWS pages 117 and/or EWS pages 117 with an EWS 116. In some implementations, the connection may be based upon, for example, a context/subject and/or user properties 123. In some implementations, the rule engine 111 can work in conjunction with the dynamic workspace generator 109 to perform its functionality, for example in implementing the following examples. For example, taking the user properties 123 of the owner of a particular EWS 116 and the subject of the EWS 116, here a patient with a medical heart condition, the rule engine 111 may execute one or more rules 122 that, on a first EWS page 117, adds a link to a medical heart organization in a module, inserts the top ten results from a search engine related to healthy heart activities into a module, inserts confidential medical information into a module, inserts emergency medical contact information for doctors in the patient's geographic area into another module, and creates a module with articles related to his heart condition. On a second EWS page 117, the rule engine 111 may create modules with contact information for other patients willing to share their information in his geographic area with the same heart condition. The rule engine 111 may also grant access to defined friends and family to his EWS 117 pages and, using the one or more rules 123, dynamically filter and/or modify what the friends and family may see on the EWS 116. For example, the patient's designated "spouse" and "children" may be able to view all content on the EWS, whereas a designated "friend" may not have access to the module with the inserted confidential medical information and the module would be removed from the associated EWS page 117 as viewed by the friend. The rule engine 111 might also include pictures of various friends and family on the EWS pages 117 to allow friend and family to place a name to a face as well as modules supporting chat functionality to allow the patient and friends and family to communicate. In this example, the patient's primary physician's contact information may also be added on the EWS 116 "home" EWS page 117 to allow friends and family to contact the physician if necessary. Another example would be implementing an online auction site using an EWS and rules 122. A buyer and seller could dynamically be presented different views of the EWS 116 based upon their user properties 123 and the rules 122.

In some implementations, a particular rule engine 111 can operate in response to and in connection with at least one request received from a content provider manager 108, dynamic workspace generator 109, and/or search engine 110. Additionally, a particular rule engine 111 may operate in response to and in connection with at least one request received from another rule engine 111, content provider manager 108, dynamic workspace generator 109, and/or search engine 110, including those associated with another EWS server 102. In some implementations, each rule engine 111 can represent a web-based application accessed and executed using the network 130 (e.g., through the Internet, or using at least one cloud-based service associated with the rule engine 111). For example, a portion of a particular rule engine 111 may be a web service associated with a rule engine 111 that is remotely called, while another portion of the particular rule engine 111 may be an interface object or agent bundled for processing at a remote client 140. Moreover, any or all of a particular rule engine 111 may be a child or sub-module of another software module or enterprise application (not illustrated) without departing from the scope of this disclosure. Still further, portions of the particular rule engine 111 may be executed or accessed by an EWS user working directly at the EWS server 102, as well as remotely at a corresponding client 140.

The client 140 may be any computing device operable to connect to or communicate with at least the EWS server 102 using the network 130. In general, the client 140 comprises a computer operable to receive, transmit, process, and store any appropriate data associated with the example distributed computing system 100. While FIG. 1 illustrates representative clients 140a-140d (collectively the client 140), the client 140 may take other forms without departing from the scope of this disclosure. For example, client 140 is intended to encompass any computing device such as a desktop computer, laptop/notebook computer, wireless data port, smart phone, personal data assistant (PDA), tablet computing device, one or more processors within these devices, or any other suitable processing device. The client 140 may include a computer that includes an input device, such as a keypad, touch screen, or other device that can accept user information, and an output device that conveys information associated with the operation of the EWS server 102, managed system 160, or the client 140 itself, including digital data, visual information, or a GUI 142, as shown with respect to the client 140.

The client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the business suite server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the EWS server 102 as well as other systems communicably coupled to the network 130 (not illustrated). The interface 152 may also be consistent with the above-described interface 104 of the EWS server 102 or other interfaces within the example distributed computing system 100. The processor 144 may be consistent with the above-described processor 106 of the EWS server 102 or other processors within the example distributed computing system 100. Specifically, the processor 144 executes instructions and manipulates data to perform the operations of the client 140, including the functionality required to send requests to the EWS server 102 and to receive and process responses from the EWS server 102. The memory 148 may be consistent with the above-described memory 107 of the EWS server 102 or other memories within the example distributed computing system 100 but storing objects and/or data associated with the purposes of the client 140.

Further, the representative client 140a illustrates a GUI 142 applicable to the remainder representative clients and the client 140 in general. The GUI 142 provides a visual interface with at least a portion of the example distributed computing system 100. Generally, through the GUI 142, an EWS server 102 user is provided with an efficient and user-friendly presentation of data provided by or communicated within the example distributed computing system 100. In particular, the GUI 142 may be used to view and navigate EWS pages served by EWS server 102 as well as create, integrate, organize, compose, modify, and delete both structured and unstructured content on EWS pages within personal and/or shared workspaces.

There may be any number of clients 140 associated with, or external to, the example distributed computing system 100. For example, while the illustrated example distributed computing system 100 includes one client 140 communicably coupled to the EWS server 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

Example Method for Search- and Context-Based Creation in Dynamic Workspaces

Figure 3:
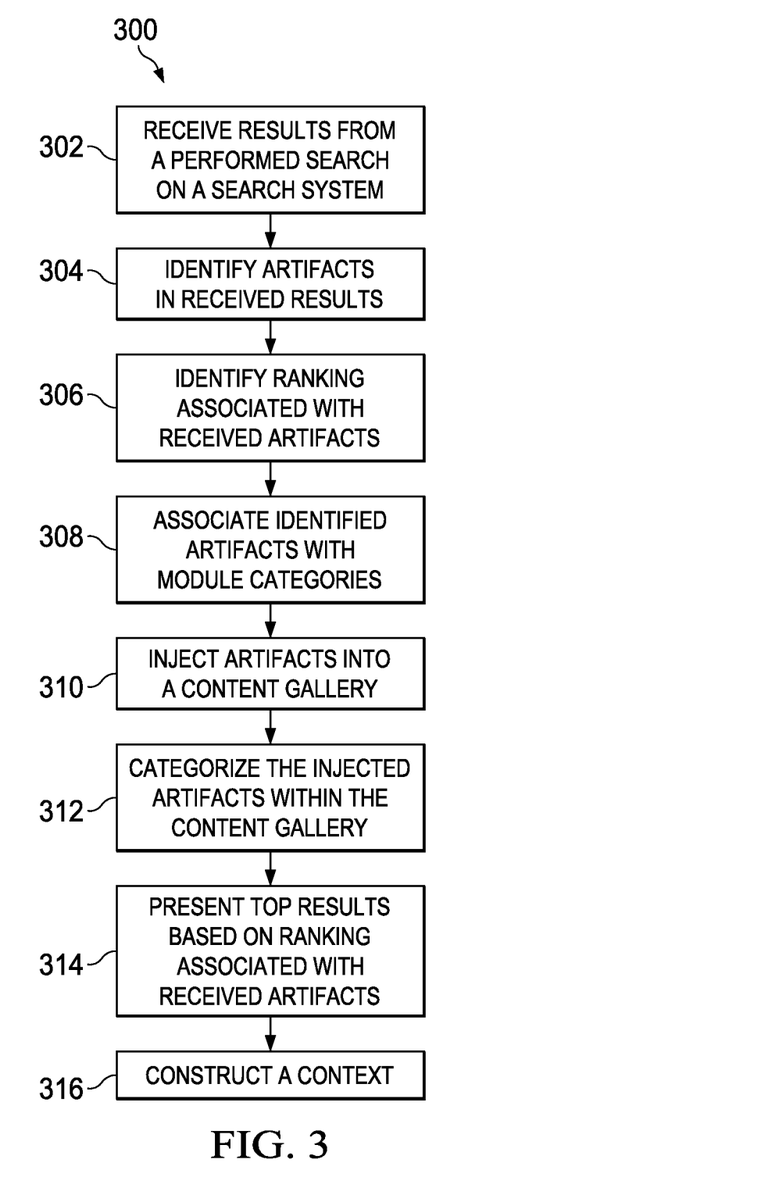
FIG. 3 is a flow chart illustrating a method for search- and context-based creation in dynamic workspaces.

Turning now to FIG. 3, FIG. 3 is a flow chart 300 illustrating a method for search- and context-based creation in dynamic workspaces. For clarity of presentation, the description that follows generally describes method 300 in the context of FIGS. 1 and 2. However, it will be understood that method 300 may be performed, for example, by any other suitable system, environment, software, and hardware, or a combination of systems, environments, software, and hardware as appropriate. For example, one or more of the EWS server, the client, or other computing device (not illustrated) can be used to execute method 300 and obtain any data from the memory of the client, the EWS server, or the other computing device. In some implementations, any of the following steps associated with method 500 can be performed by a dynamic workspace generator and/or a rule engine.

At 302, results from a search performed by an EWS user using a search system (e.g. the search engine) are received. In some implementations, the EWS user may search multiple data sources concurrently. For example, the EWS user may perform a search of Internet sources (e.g., a wiki, user groups, auction sites, medical information, etc.), databases (e.g., local conventional databases and/or in-memory databases), ECM systems (e.g., for documents, reports, etc.), and/or other suitable data sources. From 302, method 300 proceeds to 304.

At 304, artifacts in the received results are identified. Artifacts may be, for example, reports, documents, applications, data objects, and/or data artifacts such as datasets, business intelligence (BI) cubes, database views, etc. From 304, method 300 proceeds to 306.

At 306, a ranking associated with the identified artifacts is identified. For example, the ranking of the artifacts may be based on an EWS user's role, permissions, or other suitable properties. If an EWS user has an owner role for an EWS with a context of a medical support group, documents related to administration of a medical support group may be ranked higher than data objects related to a medical condition. For an EWS user with a role of member, returned views of medical condition information may be ranked higher than the previously mentioned administrative documents. From 306, method 300 proceeds to 308.

At 308, each identified data artifact is associated with a module category associated with a module further associated with a module gallery. A module gallery displays modules that may be associated with an EWS page. Modules may be, for example, a document module, a data object module, a data cube module, or a view module, or other suitable module. From 308, method 300 proceeds to 310.

At 310, the identified artifacts are injected into a content gallery. The content gallery is a user interface element that presents available content associated with a module that may be selected and added to an EWS page. The content gallery extends what is presented in a module gallery to include any artifacts as discussed above at 304 as well as other suitable artifacts. In some implementations, a chosen artifact is associated with and consumed by an appropriate module and/or modules. From 310, method 300 proceeds to 312.

At 312, the categorized artifacts injected into the content gallery are categorized. For example, if a number of documents were received in the search results and categorized as documents, an entry (e.g., an icon, link, etc.) for one or more of the identified document artifacts would be presented in the content gallery associated with the module category for "documents." The entry for each data artifact would present enough information to allow an EWS user to identify the document subject matter and to make a decision as to whether to select the document. For example, the document title might be presented as a selectable link or item in the content gallery and shown as associated with a document module by indentation, graphical connecting lines, separators, boxes, or other suitable indicator to show association with a module category. In some implementations, the artifacts may be categorized by more than one value, for example, as a type (e.g., document) and from a source (e.g., a government archive as opposed to a wiki). From 312, method 300 proceeds to 314.

At 314, the highest ranked categorized artifacts based upon the determined ranking are presented and/or indicated to the EWS user. For example, the top ranked artifacts may be highlighted, bolded, rearrange in a list, or other suitable method to present/indicate their higher ranking than other artifacts to a user. In some implementations, the higher-ranking artifacts can be presented in a separate user interface. In some implementations, the other categorized artifacts of a low rank can remain as an icon in the content gallery or in some other form. In some implementations, the top ranked artifacts can be materialized automatically into modules on one or more EWS page(s) within an EWS page layout(s). In some implementations, the EWS page layouts can be pre-defined for specific categories of artifacts/associated modules that may be based upon specific EWS user roles, permissions, or other suitable value. The EWS user may also select other items from the content gallery to add to the EWS page(s). From 314, method 300 proceeds to 316.

At 316, a context is constructed for the EWS and/or EWS page. The context is a set of one or more key-value properties, with an API to set/get properties and an ability to listen to change events. The context enables the concept of global workspace/page variables and inter-module interactions. For example, if the received search results were related to support options for patients with a specific medical heart condition in a particular city, the context of the EWS and/or EWS page may be constructed to support a social group supporting a patient with the specific medical heart condition in the particular city or geographic area. After 316, method 300 stops.

Example Method for Rule-Based Creation in Dynamic Workspaces

Figure 4:
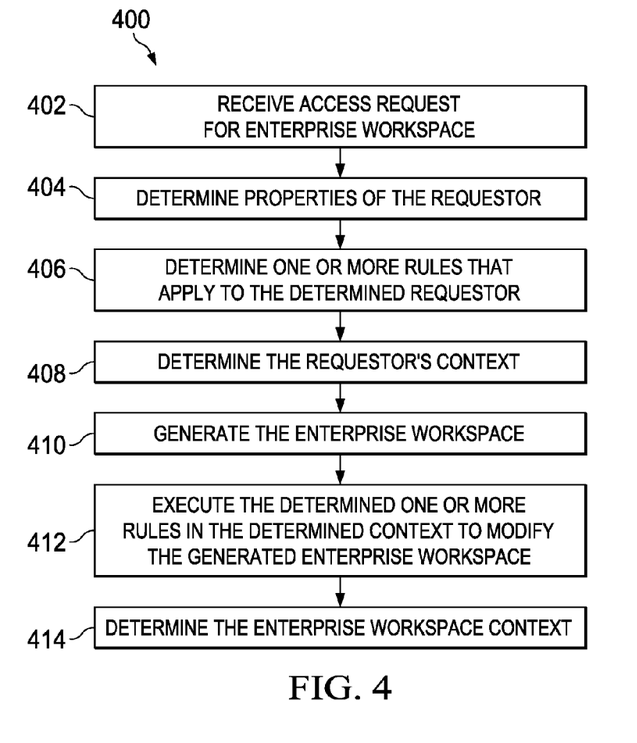
FIG. 4 is a flow chart illustrating a method for rule-based creation in dynamic workspaces.

Turning now to FIG. 4, FIG. 4 is a flow chart 400 illustrating a method for rule-based creation in dynamic workspaces. For clarity of presentation, the description that follows generally describes method 300 in the context of FIGS. 1 and 2. However, it will be understood that method 400 may be performed, for example, by any other suitable system, environment, software, and hardware, or a combination of systems, environments, software, and hardware as appropriate. For example, one or more of the EWS server, the client, or other computing device (not illustrated) can be used to execute method 400 and obtain any data from the memory of the client, the EWS server, or the other computing device. In some implementations, any of the following steps associated with method 400 can be performed by a dynamic workspace generator and/or a rule engine.

At 402, a request to access an EWS is received from a requestor. For example, for an EWS established to support a heart patient, the requestor may be a registered user of the EWS requesting an EWS page. From 402, method 400 proceeds to 404.

At 404, properties of the requestor are determined. For example, the user profile and/or other suitable may be accessed and analyzed to determine the identity, context, etc. of the requestor. In some instances, the requestor may be a single individual or multiple individuals. For example, for the heart patient's support EWS, the requestor may be the heart patient's doctor, spouse, immediate family, or friends. From 404, method 400 proceeds to 406.

At 406, one or more rules that apply to the requestor are determined based on the determined properties of the requestor. The determined one or more rules for each requestor may be different. For example, rules that determine what EWS content the doctor and the spouse of the heart patient may view may be different than the determined one or more rules for all other family members of the heart patient. From 406, method 400 proceeds to 408.

At 408, a context of the requestor is determined. In some implementations, the context can be determined from the determined properties of the requestor. The context could be a person, project, and/or group of people. For example, in the case of the EWS for the heart patient, the determined context of the requestor may be determined to be "doctor," "family-spouse," "family-non-spouse," or "friend." From 408, method 400 proceeds to 410.

At 410, the EWS is generated. In some implementations, the generated EWS is not displayed to the requestor until after 412 as described below. From 410, method 400 proceeds to 412.

At 412, the determined one or more rules are executed in the determined context to determined appropriate content to display in the requested EWS. For example, for a requestor with a "family-spouse" context, specific medial status information, diagnosis, doctor medical reports, etc. may be added by the executed rules to an EWS page generated at 410 with this information and subsequently displayed to the "family-spouse" requestor. On the other hand, for a requestor(s) with a context of "friend," the executed rules may remove specific content from the EWS page generated at 410 due to privacy laws so that a requestor with a context of "friend" may not view the removed content without specific permission granted by the heart patient or other authorized individual. In some implementations, the determined rules may include government laws/regulations, for example HIPPA, custom rules, and/or other suitable rules to add and/or filter content in an EWS. In this way, the determined rules and/or determined context applicable to the requestor/requestors may be used to add and/or filter content displayed in the EWS. In some implementations, filtered/added content can include, for example, an entire enterprise workspace, one or more EWS pages, specific content on one or more EWS pages, and/or other suitable data structures and/or content consistent with this disclosure. From 412, method 400 proceeds to 414.

At 414, the context of the EWS is determined. For example, in the case of the EWS for the heart patient, the determined EWS context could be "Medical Support," "Multi-user Medical Support," or the like. After 414, method 400 stops.

Example Method for Runtime Adaptation in Dynamic Workspaces

Figure 5:
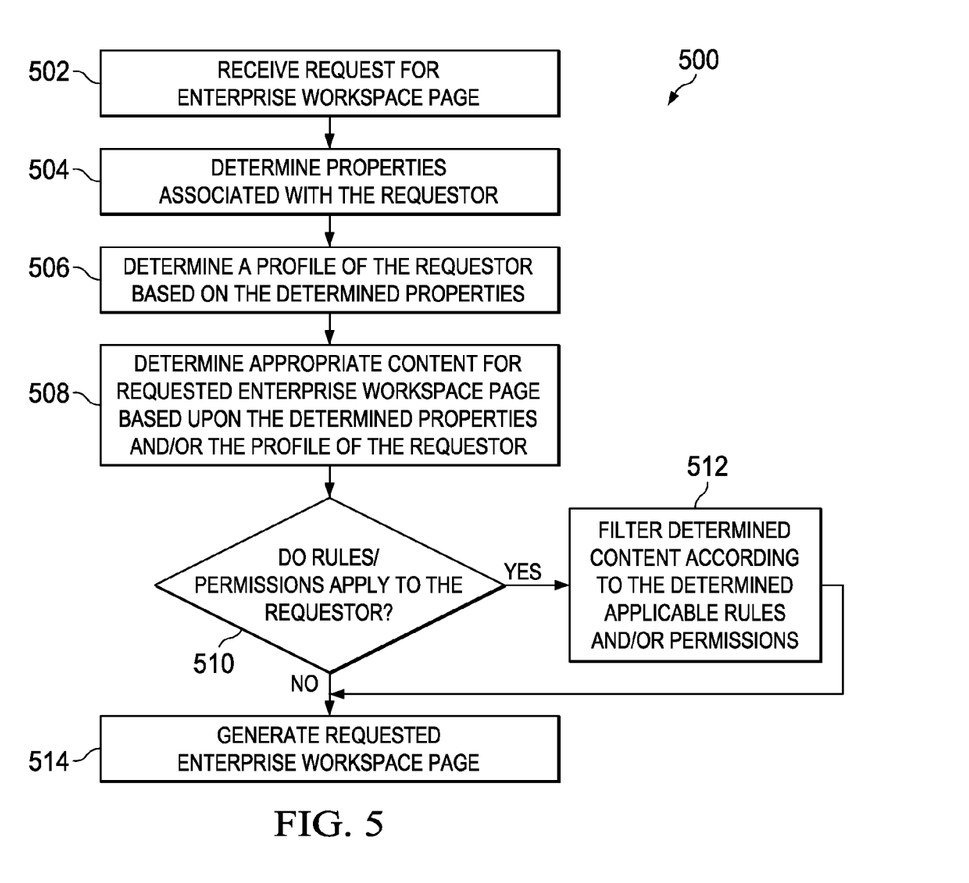
FIG. 5 is a flow chart illustrating a method for runtime adaptation in dynamic workspaces.

Turning now to FIG. 5, FIG. 5 is a flow chart 500 illustrating a method for runtime adaptation in dynamic workspaces. For clarity of presentation, the description that follows generally describes method 500 in the context of FIGS. 1 and 2. However, it will be understood that method 500 may be performed, for example, by any other suitable system, environment, software, and hardware, or a combination of systems, environments, software, and hardware as appropriate. For example, one or more of the EWS server, the client, or other computing device (not illustrated) can be used to execute method 500 and obtain any data from the memory of the client, the EWS server, or the other computing device. In some implementations, any of the following steps associated with method 500 can be performed by a dynamic workspace generator and/or a rule engine.

At 502, a request for an EWS page is received from an EWS user. From 502, method 500 proceeds to 504.

At 504, properties associated with the EWS user are determined. The properties of the EWS user may include the requestor's role, personal preferences, location, or other suitable values. From 504, method 500 proceeds to 506.

At 506, the EWS user's profile is determined based on the determined properties associated with the EWS user. From 506, method 500 proceeds to 508.

At 508, appropriate content to display on the requested EWS page is determined based upon the determined properties and/or the user profile associated with the EWS user. For example, for a particular EWS user accessing the EWS page, where the EWS user has a role of member and a user profile data value of a "friend" of the EWS owner (e.g., a patient), the EWS user (friend) may not be able to view certain medical information on the page related to the EWS owner (patient). However, the patient's physician or a particular EWS user designated with a user profile data value indicating a family relationship may be presumptively authorized to view the medical information. In this way, determined properties and an EWS user's profile may be used to filter content displayed on the requested EWS page. In some implementations, filtered content can include, for example, an entire enterprise workspace, one or more EWS pages, specific content on one or more EWS pages, and/or other suitable data structures and/or content consistent with this disclosure. From 508, method 500 proceeds to 510.

At 510, a determination is made whether any rules and/or permissions apply to the EWS user. If at 510, it is determined that rules and/or permissions apply to the EWS user, method 500 proceeds to 512 where the determined appropriate content to display on the requested EWS page is filtered according to applicable rules and/or permissions. For example, for the particular EWS user with an EWS role of member and user profile data value of "friend" attempting to access the EWS page, associated rules may specify that unless the member is an authorized viewer under government laws/regulations (e.g., HIPPA), the EWS user is not able to view certain medical information on the page related to the patient associated with the requested EWS page. However, the patient's physician or the particular EWS user designated in a user profile as a member of the heart patient's family may be authorized to view the medical information only if they are a "family:spouse," "family:guardian," etc. As a result, the determined appropriate content is filtered by rules and/or permissions applicable to the EWS user to only allow appropriate content to be displayed to the EWS user. In some implementations, filtered content can include, for example, an entire enterprise workspace, one or more EWS pages, specific content on one or more EWS pages, and/or other suitable data structures and/or content consistent with this disclosure. If at 512, however, it is determined that that rules and/or permissions do not apply to the EWS user, method 500 proceeds to 514.

At 514, the requested EWS page is generated. After 514, method 500 stops.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
    identifying a data artifact associated with each search result of at least one received search result;
    associating each identified data artifact with a module category of a plurality of module categories, the module category associated with a module associated with a module gallery displaying modules that may be associated with an enterprise workspace page associated with an enterprise workspace;
    injecting the identified artifacts into a content gallery presenting available content associated with a module available to be selected and added to the enterprise workspace page and extending what is displayed in the module gallery to include non-identified artifacts;
    categorize, by operation of at least one computer, the injected identified artifacts within the content gallery;
    presenting at least a subset of the injected identified artifacts on the enterprise workspace page; and
    constructing a context associated with at least one of the enterprise workspace or the enterprise workspace page.

2. The computer-implemented method of claim 1, further comprising, prior to identifying the data artifact associated with each search result, receiving at least one search result from a search system, wherein the search system has access to internal and external data sources.

3. The computer-implemented method of claim 1, further comprising, identifying a ranking associated with each identified data artifact.

4. The computer-implemented method of claim 3, wherein the subset of injected identified artifacts presented on the enterprise workspace page is selected based upon the identified ranking.

5. The computer-implemented method of claim 1, wherein injected identified artifacts are categorized within the content gallery according to a type and a source.

6. The computer-implemented method of claim 1, wherein the subset of the injected identified artifacts is arranged on the enterprise workspace page according to a predefined enterprise workspace page layout.

7. The computer-implemented method of claim 1, further comprising adding non-presented injected artifacts from the content gallery to the enterprise workspace page.

8. A computer-program product, comprising computer-readable instructions embodied on tangible, non-transitory media, the computer-readable instructions operable when executed to:
    identify a data artifact associated with each search result of at least one received search result;
    associate each identified data artifact with a module category of a plurality of module categories, the module category associated with a module associated with a module gallery displaying modules that may be associated with an enterprise workspace page associated with an enterprise workspace;
    inject the identified artifacts into a content gallery presenting available content associated with a module available to be selected and added to the enterprise workspace page and extending what is displayed in the module gallery to include non-identified artifacts;
    categorize the injected identified artifacts within the content gallery;
    present at least a subset of the injected identified artifacts on the enterprise workspace page; and
    construct a context associated with at least one of the enterprise workspace or the enterprise workspace page.

9. The computer-program product of claim 8, further comprising instructions operable to, prior to identifying the data artifact associated with each search result, receive at least one search result from a search system, wherein the search system has access to internal and external data sources.

10. The computer-program product of claim 8, further comprising instructions operable to identify a ranking associated with each identified data artifact.

11. The computer-program product of claim 10, wherein the subset of injected identified artifacts presented on the enterprise workspace page is selected based upon the identified ranking.

12. The computer-program product of claim 8, wherein injected identified artifacts are categorized within the content gallery according to a type and a source.

13. The computer-program product of claim 8, wherein the subset of the injected identified artifacts is arranged on the enterprise workspace page according to a predefined enterprise workspace page layout.

14. The computer-program product of claim 8, further comprising instructions operable to add non-presented injected artifacts from the content gallery to the enterprise workspace page.

15. A system, comprising:
  memory operable to store at least an enterprise workspace; and
  at least one hardware processor interoperably coupled to the memory and operable to:
    identify a data artifact associated with each search result of at least one received search result;
    associate each identified data artifact with a module category of a plurality of module categories, the module category associated with a module associated with a module gallery displaying modules that may be associated with an enterprise workspace page associated with an enterprise workspace;
    inject the identified artifacts into a content gallery presenting available content associated with a module available to be selected and added to the enterprise workspace page and extending what is displayed in the module gallery to include non-identified artifacts;
    categorize the injected identified artifacts within the content gallery;
    present at least a subset of the injected identified artifacts on the enterprise workspace page; and
    construct a context associated with at least one of the enterprise workspace or the enterprise workspace page.

16. The system of claim 15, further operable to, prior to identifying the data artifact associated with each search result, receive at least one search result from a search system, wherein the search system has access to internal and external data sources.

17. The system of claim 15, further operable to identify a ranking associated with each identified data artifact.

18. The system of claim 17, wherein the subset of injected identified artifacts presented on the enterprise workspace page is selected based upon the identified ranking.

19. The system of claim 15, wherein injected identified artifacts are categorized within the content gallery according to a type and a source.

20. The system of claim 15, wherein the subset of the injected identified artifacts is arranged on the enterprise workspace page according to a predefined enterprise workspace page layout.

21. The system of claim 15, further operable to add non-presented injected artifacts from the content gallery to the enterprise workspace page.

* * * * *